(12) United States Patent
Hong et al.

(10) Patent No.: US 11,826,927 B2
(45) Date of Patent: Nov. 28, 2023

(54) RECYCLING APPARATUS FOR A CROSS-LINKED POLYETHYLENE RESIN USING TWIN SCREW EXTRUDER

(71) Applicant: KOREA INSTITUTE OF SCIENCE AND TECHNOLOGY, Seoul (KR)

(72) Inventors: Soon Man Hong, Seoul (KR); Hang Kyu Cho, Seoul (KR); Seung Sang Hwang, Seoul (KR); Chong Min Koo, Seoul (KR); Seon Joon Kim, Seoul (KR); Albert Lee, Seoul (KR); Hwan Gyu Lee, Seoul (KR); Junpyo Hong, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 184 days.

(21) Appl. No.: 17/501,806

(22) Filed: Oct. 14, 2021

(65) Prior Publication Data

US 2022/0339820 A1   Oct. 27, 2022

(30) Foreign Application Priority Data

Apr. 23, 2021 (KR) ........................ 10-2021-0053186

(51) Int. Cl.
| | |
|---|---|
| *B29B 7/48* | (2006.01) |
| *C08J 11/10* | (2006.01) |
| *C08J 11/14* | (2006.01) |
| *C08J 11/24* | (2006.01) |
| *B29C 48/78* | (2019.01) |

(Continued)

(52) U.S. Cl.
CPC ............ *B29B 7/48* (2013.01); *B29C 48/405* (2019.02); *B29C 48/505* (2019.02); *B29C 48/78* (2019.02); *C08J 11/10* (2013.01); *C08J 11/14* (2013.01); *C08J 11/24* (2013.01); *B01J 3/008* (2013.01);

(Continued)

(58) Field of Classification Search
None
See application file for complete search history.

(56) References Cited

U.S. PATENT DOCUMENTS

| | | | |
|---|---|---|---|
| 7,189,762 B2 * | 3/2007 | Tzoganakis | ............. B29B 17/00 521/40.5 |
| 2009/0082475 A1 * | 3/2009 | Zhang | .................. C08L 19/003 521/45.5 |

FOREIGN PATENT DOCUMENTS

| | | |
|---|---|---|
| KR | 10-0139884 B1 | 12/1998 |
| KR | 1020130134344 A | 12/2013 |

(Continued)

*Primary Examiner* — Jennifer A Leung
(74) *Attorney, Agent, or Firm* — Rabin & Berdo, P.C.

(57) ABSTRACT

Disclosed is a recycling apparatus for a cross-linked polyethylene resin using a twin screw extruder. The recycling apparatus for a cross-linked polyethylene resin using a twin screw extruder according to an embodiment of the present disclosure includes: a raw material supply unit configured to supply a raw material that is a cross-linked polyethylene resin; and a twin screw extruder configured to receive the raw material from the raw material supply unit, the twin screw extruder including a cylinder and a twin screw installed inside the cylinder to rotate in the same direction, the twin screw extruder being configured to de-crosslink and recycle the raw material under a de-crosslinking reaction temperature and reaction pressure atmosphere while continuously transporting the raw material along the twin screw by the rotation of the twin screw.

9 Claims, 3 Drawing Sheets

(51) Int. Cl.
    *B29C 48/505*     (2019.01)
    *B29C 48/405*     (2019.01)
    *B29K 23/00*     (2006.01)
    *B01J 19/02*     (2006.01)
    *B01J 3/00*     (2006.01)

(52) U.S. Cl.
    CPC ....... *B01J 19/02* (2013.01); *B29K 2023/0691* (2013.01); *C08J 2323/26* (2013.01)

(56) References Cited

FOREIGN PATENT DOCUMENTS

| | | |
|---|---|---|
| KR | 1020160009505 A | 1/2016 |
| KR | 10-1627720 B1 | 6/2016 |
| KR | 10-1703108 B1 | 2/2017 |

\* cited by examiner ive recycling technology for the raw materials. Therefore, the development of technology capable of successively recycling cross-linked high-density polyethylene and improving the properties and productivity of the recycled high-density polyethylene resin is urgently required in terms of recycling and commercialization of cross-linked high-density polyethylene.

RECYCLING APPARATUS FOR A CROSS-LINKED POLYETHYLENE RESIN USING TWIN SCREW EXTRUDER

CROSS-REFERENCE TO RELATED APPLICATIONS

This application claims priority under 35 U.S.C. § 119 to Korean Patent Application No. 10-2021-0053186 filed on Apr. 23, 2021 in the Korean Intellectual Property Office, the disclosure of which is incorporated herein by reference in its entirety.

BACKGROUND

1. Field

The present disclosure relates to a recycling apparatus for a cross-linked polyethylene resin using a twin screw extruder, and more particularly, to a recycling apparatus for a cross-linked polyethylene resin using a twin screw extruder, which may successively de-crosslink and recycle a cross-linked polyethylene resin using a twin screw extruder.

2. Description of the Related Art

Polyethylene is a chain-shaped polymer compound produced by polymerization of ethylene, and is produced as various containers, packaging films, fibers, pipes, and packings by extrusion molding, hollow molding, or the like.

Polyethylene, like other thermoplastic resins, begins to soften and eventually melts as the temperature rises. Low-density polyethylene (LDPE) melts at 100 to 105° C., and it begins to soften near 90° C. Thus, when being used in high-voltage cables where the temperature rises above 90° C., the LDPE loses its function as it begins to soften. Also, in the case of high-density polyethylene (HDPE) used for Ondol pipe, un-crosslinked polyethylene is thermally oxidized by high temperature and loses its function, so that it cannot be used for a long time.

As a result, polyethylene having excellent insulation and chemical resistance but having weakness in heat is cross-linked through a radical reaction that connects the linear polyethylene structure to a network form in order to compensate for its weakness in heat, so that it is stable to heat and has excellent chemical resistance and thus is used for wires, Ondol pipes, or the like. However, once the cross-linked polyethylene is cross-linked, it cannot be recycled because it is not melted again.

The cross-linked polyethylene is representatively used as wires or Ondol pipes, and scraps generated during the production of wires or Ondol pipes and wastes of wires or Ondol pipes are mostly incinerated after being entrusted to a specialized waste disposal company, and some of them are pulverized and used as a filler.

However, since gas generated during incineration may cause air pollution and incidental cost may be caused by incineration, there is an urgent need to find a method for recycling and using polyethylene again.

Meanwhile, as in Patent Literatures 1, 2 and 3, only some of the cross-linked low-density polyethylene wires may be recycled into polyethylene resin using a supercritical single screw extruder, but the low-density polyethylene resin recycled in this way has poor properties and inefficient productivity.

Most of the crosslinked high-density polyethylene-based Ondol pipes for hot water are incinerated because there is no successive recycling technology for the raw materials. Therefore, the development of technology capable of successively recycling cross-linked high-density polyethylene and improving the properties and productivity of the recycled high-density polyethylene resin is urgently required in terms of recycling and commercialization of cross-linked high-density polyethylene.

RELATED LITERATURES

Patent Literature

[Patent Literature 1] Korean Patent Registration No. 10-0139884 (published on Mar. 6, 1998)
[Patent Literature 1] Korean Patent Registration No. 10-1703108 (published on Feb. 7, 2017)
[Patent Literature 1] Korean Patent Registration No. 10-1627720 (published on Jun. 8, 2016)

SUMMARY

Therefore, the technical object to be solved by the present disclosure is to provide a recycling apparatus for a cross-linked polyethylene resin using a twin screw extruder, which may successively de-crosslink and recycle a cross-linked polyethylene and improve the properties and productivity of the recycled polyethylene.

According to one aspect of the present disclosure, it is possible to provide a recycling apparatus for a cross-linked polyethylene resin using a twin screw extruder, comprising: a raw material supply unit configured to supply a raw material that is a cross-linked polyethylene resin; and a twin screw extruder configured to receive the raw material from the raw material supply unit, the twin screw extruder including a cylinder and a twin screw installed inside the cylinder to rotate in the same direction, the twin screw extruder being configured to de-crosslink and recycle the raw material under a de-crosslinking reaction temperature and reaction pressure atmosphere while continuously transporting the raw material along the twin screw by the rotation of the twin screw.

The twin screw may include: a supply part configured to press and melt the raw material while transporting the raw material; a melting part configured to melt and knead the raw material transported through the supply part; a reaction part configured to inject a supercritical fluid serving as a reaction solvent into the raw material transported through the melting part to maintain a supercritical condition and to de-crosslink the raw material; and a discharge part configured to process and discharge the de-crosslinked and recycled polyethylene resin.

The melting part may include: a plurality of first block groups configured by combining a plurality of kneading blocks and spaced apart from each other; and a reverse spiral portion successively disposed at a rear end of any one of the first block groups, and the first block group may include: at least one forward kneading block successively disposed along a transporting direction of the raw material; and a neutral kneading block successively disposed at the forward kneading block along the transporting direction of the raw material.

Three first block groups may be disposed to be spaced apart from each other along the transporting direction of the raw material, a third spiral portion may be disposed at a rear end of the first block group in the first order, a fourth spiral portion and a fifth spiral portion may be disposed at a rear end of the first block group in the second order, a sixth spiral portion and a seventh spiral portion may be disposed at a rear end of the first block group in the third order, the fourth spiral portion may be formed to have a greater pitch than the fifth spiral portion, the sixth spiral portion may be formed to have a greater pitch than the seventh spiral portion, and the reverse spiral portion may be disposed at a front end of the fourth spiral portion.

The reaction part may include: a second block group configured by combining a plurality of kneading blocks and tooth blocks; a third block group disposed to be spaced apart from the second block group and configured by combining the plurality of kneading blocks; and an eighth spiral portion successively disposed at a rear end of the second block group, the second block group may include forward kneading blocks and the tooth blocks alternatively arranged along the transporting direction of the raw material, and the third block group may include: a forward kneading block; a neutral kneading block successively disposed at the forward kneading block along the transporting direction of the raw material; and a reverse kneading block successively disposed at the neutral kneading block along the transporting direction of the raw material.

The discharge part may include a ninth spiral portion and a tenth spiral portion successively disposed along a transporting direction of the raw material, and the ninth spiral portion may be formed to have a greater pitch than the tenth spiral portion.

The reaction solvent may be a distilled water in a supercritical state, methanol, ethanol, or a mixture thereof.

The twin screw extruder may be configured to melt, knead, de-crosslink and process the raw material at a reaction temperature of 280 to 400° C. and a reaction pressure of 0.1 to 20 MPa.

The reaction part may be made of stainless steel 316 (SUS316) with excellent chemical resistance, and the supply part, the melting part and the discharge part may be made of nickel chromium molybdenum steel (SNCM21) with excellent wear resistance.

A ratio (L/D) of total length to diameter of the twin screw may be 32:1 to 48:1.

The raw material may include a cross-linked polyethylene wire, a cross-linked polyethylene foam, and a cross-linked polyethylene Ondol pipe.

The embodiment of the present disclosure may manufacture the recycled polyethylene by melting, kneading, de-crosslinking and processing while continuously transporting an Ondol pipe for hot water and cross-linked polyethylene-based products using twin screw that rotates in the same direction under a de-crosslinking atmosphere, and may control physical properties and improve productivity.

DETAILED DESCRIPTION

Figure 1:
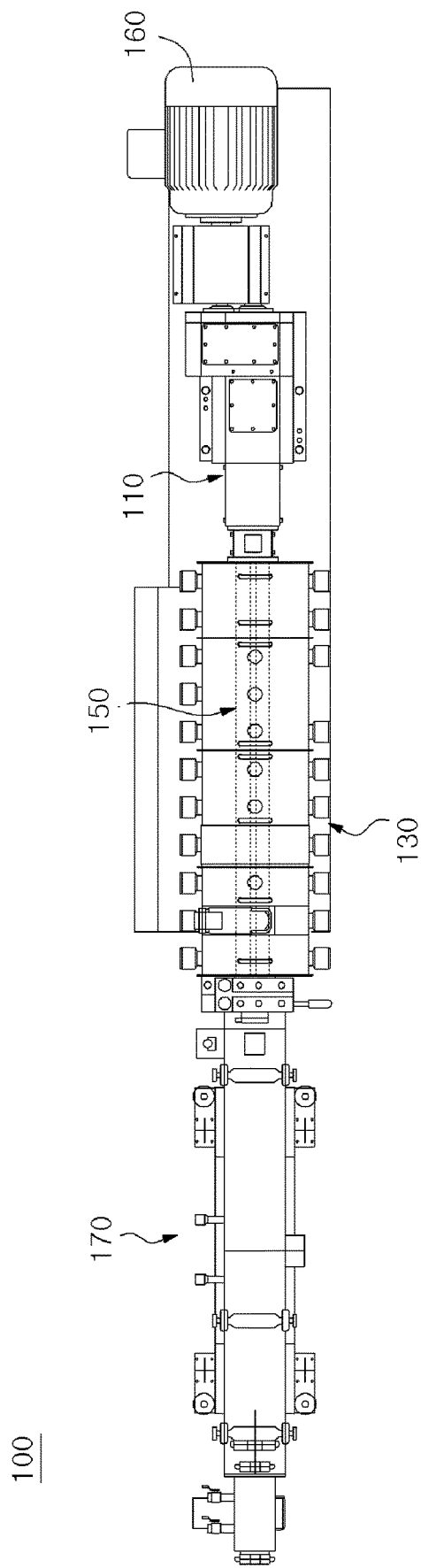
FIG. 1 is a diagram showing a recycling apparatus for a cross-linked polyethylene resin using a twin screw extruder according to an embodiment of the present disclosure.

In order to fully understand the operational advantages of the present disclosure and the object achieved by implementing the present disclosure, reference should be made to the accompanying drawings illustrating preferred embodiments of the present disclosure and the contents described in the accompanying drawings.

Hereinafter, the present disclosure will be described in detail by explaining a preferred embodiment of the present disclosure with reference to the accompanying drawings. Like reference numerals in each figure indicate like elements.

Figure 2:
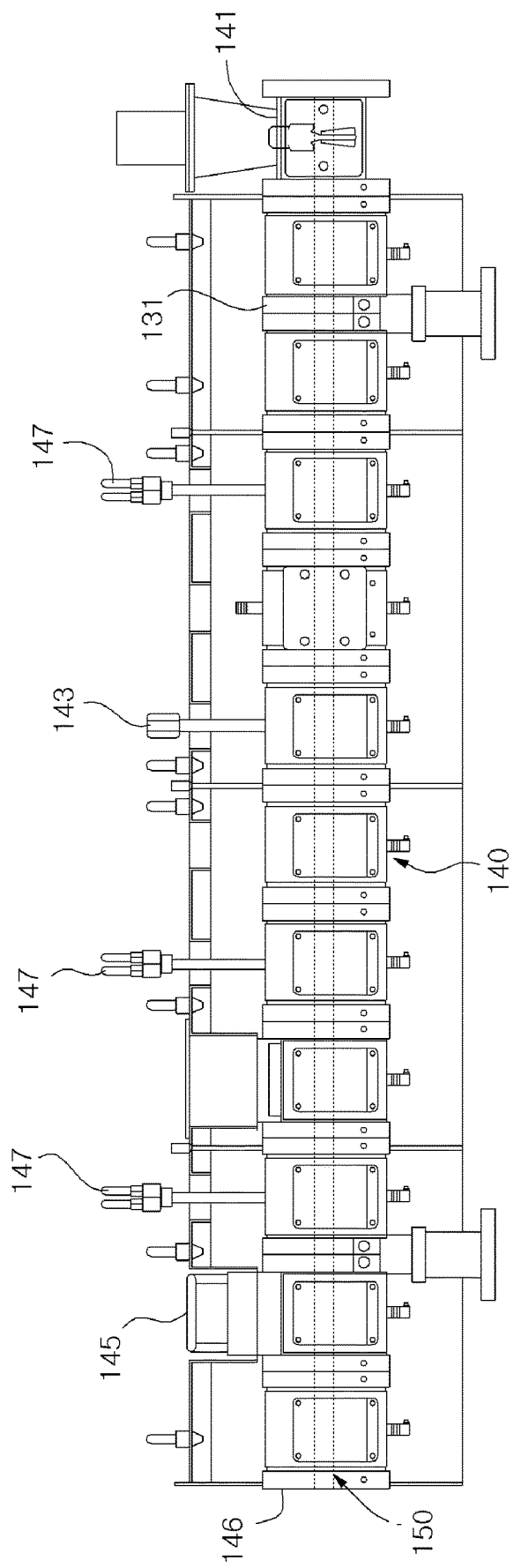
FIG. 2 is a side view showing the twin screw extruder according to an embodiment of the present disclosure.
Figure 3:
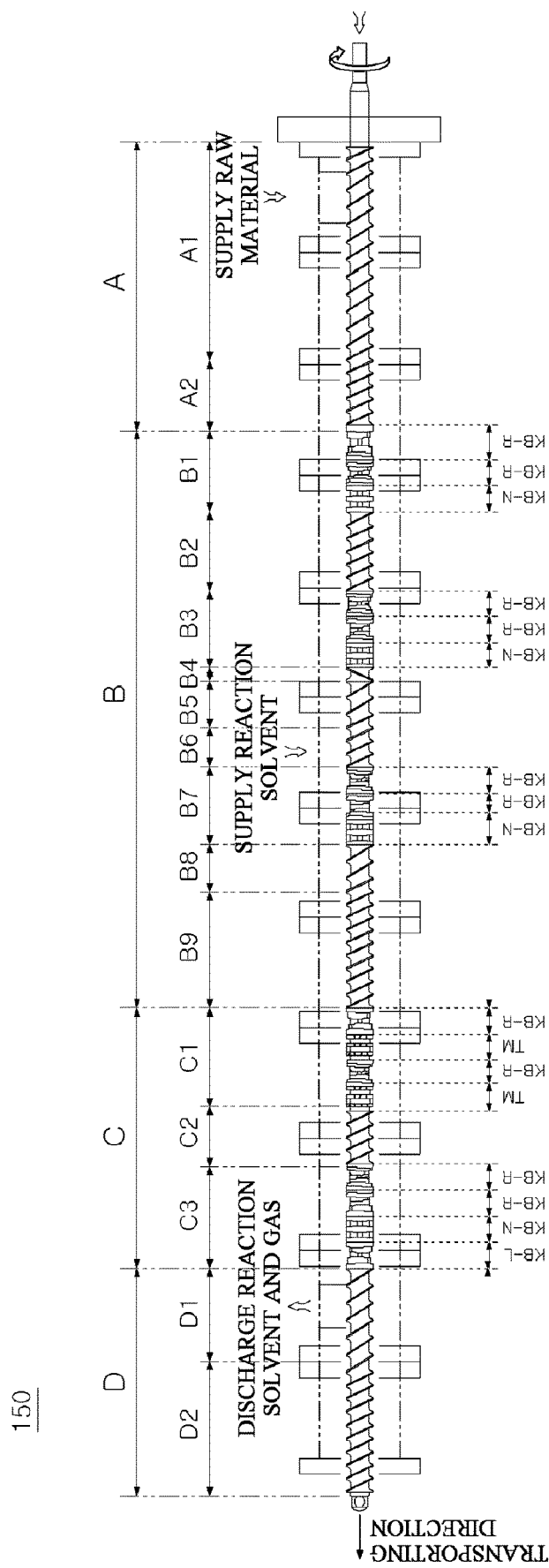
FIG. 3 is a sectional view showing the twin screw extruder according to an embodiment of the present disclosure.

FIG. 1 is a diagram showing a recycling apparatus for a cross-linked polyethylene resin using a twin screw extruder according to an embodiment of the present disclosure. FIG. 2 is a side view showing the twin screw extruder according to an embodiment of the present disclosure. FIG. 3 is a sectional view showing the twin screw extruder according to an embodiment of the present disclosure.

Referring to FIGS. 1 to 3, the recycling apparatus 100 for a cross-linked polyethylene resin using a twin screw extruder according to an embodiment of the present disclosure includes a raw material supply unit 110 for supplying a raw material, which is a cross-linked polyethylene resin, a twin screw extruder 130 for recycling the raw material supplied from the raw material supply unit 110, a temperature regulator (not shown) for regulating the temperature in a cylinder 140 of the twin screw extruder 130, and a cooling unit 170 for cooling the recycled polyethylene resin discharged from the twin screw extruder 130.

In this embodiment, the raw material that is a cross-linked polyethylene resin includes Ondol pipes, wires, foams, etc. made of a cross-linked polyethylene resin such as linear low-density polyethylene (LLDPE), low-density polyethylene (LDPE), and high-density polyethylene (HDPE). Specifically, the raw material includes cross-linked polyethylene wires (linear low-density polyethylene, low-density polyethylene), cross-linked polyethylene foams, cross-linked polyethylene Ondol pipes (high-density polyethylene), and the like.

In the present disclosure, the raw material, which is a cross-linked polyethylene resin, may be melted, kneaded, de-crosslinked and processed using the twin screw extruder 130 to successively manufacture recycled polyethylene resin in the form of pellets or wire, thereby improving the productivity of recycled polyethylene.

In addition, in the present disclosure, the polyethylene resin is recycled by de-crosslinking the raw material using heat inside the twin screw extruder 130 and physical force such as friction between the cylinder 140 and the twin screw 150 of the twin screw extruder 130 and the molten raw material. Also, in the present disclosure, since the degree of crosslinking and the molecular weight of the recycled polyethylene resin may be controlled, the physical properties of the recycled polyethylene may be improved.

The raw material supply unit 110 according to this embodiment serves to supply the raw material, which is a cross-linked polyethylene resin, to the twin screw extruder 130.

The raw material supply unit 110 may pulverize the raw material to a size of 4 mm or less, and then supply the same to the twin screw extruder 130 so that the raw material may be easily pulverized, melted, and kneaded in the twin screw extruder 130.

The twin screw extruder 130 according to this embodiment plays a role of receiving the raw material, which is a cross-linked polyethylene resin, from the raw material supply unit 110, and producing recycled polyethylene by melting, kneading, de-crosslinking and processing the raw material while continuously transporting the raw material.

The twin screw extruder 130 includes a cylinder 140, a twin screw 150 installed inside the cylinder 140 and rotating in the same direction, and a driving motor 160 connected to the twin screw 150 to rotate the twin screw 150 in the same direction.

In particular, the twin screw extruder 130 de-crosslinks the raw material with a reaction solvent, which is a supercritical fluid, under a de-crosslinking reaction temperature and reaction pressure atmosphere while continuously transporting the raw material along the twin screw 150 inside the cylinder 140 by the rotation of the twin screw 150, thereby recycling the raw material into a recyclable polyethylene resin.

Here, the supercritical fluid serving as the reaction solvent is in a critical state condition where a general liquid or gaseous substance crosses the limits of high temperature and high pressure, called a critical point, so that gas and liquid cannot be distinguished. The supercritical fluid has low density, high solubility, and excellent diffusivity.

In this embodiment, ethanol, distilled water, methanol, or a mixture thereof may be used as the reaction solvent to maintain the supercritical condition.

As shown in FIGS. 2 and 3, the twin screw extruder 130 according to this embodiment is a screw type continuous extruder. Since the screw type extruder includes a barrel 131 and a screw element configured as segments, a user may combine a plurality of screw elements in a modular manner as desired.

In the twin screw extruder 130, the twin screw 150 is installed inside the cylinder 140 to form a reaction pressure atmosphere for de-crosslinking the raw material, and a temperature regulator is installed at the outer circumferential surface of the cylinder 140 to form a reaction temperature atmosphere for de-crosslinking the raw material. Specifically, the twin screw extruder 130 according to this embodiment performs melting, kneading, de-crosslinking and processing of the raw material under an atmosphere of reaction temperature of 280 to 400° C. and reaction pressure of 0.1 to 20 MPa.

The twin screw extruder 130 may control the residence time of the cross-linked polyethylene according to the injection amount of the pulverized cross-linked polyethylene and the rotation speed of the twin screw 150, and may control the molecular weight and physical properties according to the reaction temperature, the reaction pressure, the amount of raw material supplied, and the rotation speed of the twin screw 150.

A plurality of pressure and temperature sensors 147 are installed at the cylinder 140, and it is possible to confirm that the de-crosslinking reaction proceeds in the cylinder 140 under a supercritical atmosphere.

The twin screw 150 according to this embodiment is a screw assembly in which a plurality of screw elements are combined. Two screw assemblies shown in FIG. 3 are arranged side by side inside the cylinder 140 (see FIG. 1) and are is rotated in the same direction by the driving motor 160.

In this embodiment, the twin screw 150 has a multi-step area for melting, kneading, de-crosslinking and processing the raw material, which is a cross-linked polyethylene resin, supplied into the cylinder 140.

In addition, in order to completely melt the raw material and obtain the pressure for discharging the recycled polyethylene, after reviewing thermal diffusivity, power-law coefficient, melting point, die head pressure, viscosity, crystallinity, and the like, the ratio (L/D) of length (L) to diameter (D) of the twin screw 150 suitable for manufacturing recycled polyethylene by melting, kneading, de-crosslinking and processing the raw material is determined.

The ratio (L/D) of total length (L) to diameter (D) of the twin screw 150 according to this embodiment may range from 32:1 to 48:1. In particular, in this embodiment, the ratio (L/D) of total length (L) to diameter (D) of the twin screw 150 may be 48:1, so that the de-crosslinking reaction area and reaction time may be elongated by increasing the residence time required for recycling the cross-linked polyethylene resin. Here, the diameter of the twin screw 150 means an average diameter of the twin screw 150.

Meanwhile, if the L/D of the twin screw exceeds 48:1, the twin screw is bent during processing and the twin screw is worn due to friction with the barrel 131 inside the cylinder 140, and also the physical properties deteriorate due to the increase of residence time of the raw material and the increase of de-crosslinking reaction time. In particular, equipment design, installation costs and electrical energy costs are increased.

In addition, if the LID of the twin screw is less than 32:1, the degree of shear stress transmission and de-crosslinking is small due to the decrease in the residence time of the raw material and reaction time, so de-crosslinking does not occur. Therefore, it cannot be used as a recycled raw material.

As shown in FIG. 3, the twin screw 150 according to this embodiment is divided into areas of a supply part A, a melting part B, a reaction part C, and a discharge part D to create a reaction pressure atmosphere necessary for the de-crosslinking reaction when melting, kneading, de-crosslinking and processing the raw material while continuously transporting the raw material injected into the cylinder 140.

Meanwhile, in this embodiment, the twin screw 150 has a long length, uses a reaction solvent and performs a high-temperature, high-viscosity and high-pressure extrusion process, so it is preferable to separate the twin screw 150 into areas to be made of nickel-chromium-molybdenum steel (SNCM21) and stainless steel 316 (SUS316). In particular, the supply part A, the melting part B and the discharge part D may be made of nickel chromium molybdenum steel (SNCM21) with excellent wear resistance, and the reaction part C where a solvent is injected and the de-crosslinking reaction occurs may be made of stainless steel 316 (SUS316) with excellent chemical resistance.

The supply part A is an area where the raw material is pulverized, pressurized and melted while transporting the raw material supplied from the raw material supply unit 110.

The supply part A includes a first spiral portion A1 and a second spiral portion A2 formed successively along the transporting direction of the raw material. In addition, the first spiral portion A1 is formed to have a greater pitch than the second spiral portion A2.

By the shape of the first spiral portion A1 and the second spiral portion A2 of the supply part A as described above, the raw material is gradually pressed and melted while being transported along the first spiral portion A1 and the second spiral portion A2. In addition, it is possible to prevent the reaction solvent injected into the melting part B from reversely flowing by concentrating the raw material at a rear end of the second spiral portion A2 of the supply part A.

Meanwhile, the cylinder 140 includes an input part 141 at a position corresponding to the first spiral portion A1 so that the pulverized cross-linked polyethylene raw material is supplied thereto from the raw material supply unit 110.

The melting part B is an area where the raw material transported through the supply part A is completely melted and kneaded.

The melting part B is configured by combining a plurality of kneading blocks KB, and includes a plurality of first block groups B1, B3, B7 spaced apart from each other, and a reverse spiral portion B4 successively disposed at a rear end of any one of the first block groups B1, B3, B7.

In this embodiment, three first block groups B1, B3, B7 are arranged to be spaced apart from each other along the transporting direction of the raw material. The first block groups B1, B3, B7 improve the melting and kneading properties of the raw material. The reverse spiral portion B4 increases the residence time of the raw material to further improve the melting and kneading properties of the raw material.

In addition, in the melting part B, the third spiral portion B2 is successively disposed at the rear end of the first block group B1 in the first order along the transporting direction of the raw material. Also, the reverse spiral portion B4, the fourth spiral portion B5, and the fifth spiral portion B6 are successively disposed at the rear end of the first block group B3 in the second order. In addition, the sixth spiral portion B8 and the seventh spiral portion B9 are successively disposed at the rear end of the first block group B7 in the third order. The third to seventh spiral portions B2, B5, B6, B8, B9 facilitate the transportation of the raw material after the raw material are melted and kneaded by the first block groups B1, B3, B7.

The first block groups B1, B3, B7 improve the melting and kneading of the raw material, and the third to seventh spiral portions B2, B5, B6, B8, B9 serve to transport the raw material.

The kneading block has a discontinuous structure in which independent elliptical disks are arranged at a certain angle, respectively. The kneading block is divided into a forward kneading block KB-R a reverse kneading block KB-L, and a neutral kneading block KB-N according to the moving direction of the raw material.

In the forward kneading block KB-R the raw material is transported toward a die, namely toward the discharge part D, by the rotation of the kneading block, and in the reverse kneading block KB-L, the raw material is transported in a direction opposite to the transporting direction by the rotation of the kneading block. In addition, in the neutral kneading block KB-N, the raw material does not move.

Although not shown, for the forward kneading block KB-R a 5R type in which five disks are arranged at an angle of 45° to each other in a clockwise direction or a 7R type in which seven disks are arranged at an angle of 30° to each other in a clockwise direction may be used.

In addition, for the reverse kneading block KB-L, a 5L type in which five disks are arranged at an angle of 45° to each other in a counterclockwise direction may be used.

In addition, for the neutral kneading block KB-N, a 5N type in which five disks are arranged at an angle of 90° to each other in a clockwise direction may be used.

In this embodiment, the first block group B1 in the first order is successively disposed at the rear end of the second spiral portion A2 of the supply part A, and is configured by combining two forward kneading blocks KB-R and one neutral kneading block KB-N along the transporting direction of the raw material. The first block group B3 in the second order is successively disposed at the rear end of the third spiral portion B2, and is configured by combining two forward kneading blocks KB-R and one neutral kneading block KB-N along the transporting direction of the raw material. The third first block group B7 is successively disposed at the rear end of the fourth spiral portion B5, and is configured by combining two forward kneading blocks KB-R and one neutral kneading block KB-N along the transporting direction of the raw material.

Meanwhile, if three first block groups B1, B3, B7 are successively disposed, the residence time of the raw material may become excessively long, and the raw material may receive a lot of shear to intensify the thermal decomposition. Thus, in this embodiment, three first block groups B1, B3, B7 are provided to be spaced apart from each other to improve the melting and kneading properties of the raw material. In addition, in this embodiment, the third to seventh spiral portions B2, B5, B6, B8, B9 are provided at the rear ends of the first block groups B1, B3, B7, respectively, in order to facilitate the transportation after improving the kneading property of the raw material.

Also, in this embodiment, since the reverse spiral portion B4 is provided between the rear end of the first block group B3 in the second order and the fourth spiral portion B5, the residence time of the raw material is increased by the reverse spiral portion B4, so that the melting and kneading properties of the raw material may be further improved in the first block group B3 in the second order.

Meanwhile, the third spiral portion B2 may be formed to have the same pitch as the second spiral portion A2. In addition, the fourth spiral portion B5 is formed to have a greater pitch than the fifth spiral portion B6. In this case, the fifth spiral portion B6 may be formed to have the same pitch as the third spiral portion B2. In addition, the sixth spiral portion B8 is formed to have a greater pitch than the seventh spiral portion B9. In this case, the seventh spiral portion B9 may be formed to have the same pitch as the fifth spiral portion B6.

The third to seventh spiral portions B2, B5, V6, B8, B9 of the melting part B as described above facilitates the transportation of the raw material after the raw material are melted and kneaded by the first block groups B1, B3, B7. In particular, since the fifth spiral portion B6 has a smaller pitch than the fourth spiral portion B5, the raw material is concentrated in the fifth spiral portion B6 and then transported to the first block group B3 in the second order. Also, since the seventh spiral portion B9 has a smaller pitch than the sixth spiral portion B8, the raw material is concentrated in the seventh spiral portion B9, and then transported to a second block group C1, explained later.

Meanwhile, the cylinder 140 includes a solvent supply part 143 provided at a position corresponding to the fifth spiral portion B6 so that the reaction solvent is supplied thereto. In the first block group B7 in the third order, the sixth spiral portion B8 and the seventh spiral portion B9, the reaction solvent is mixed and kneaded with the melted raw material.

In addition, since the inside of the twin screw extruder 130 is maintained in a high temperature and high pressure state by melting and kneading in the twin screw extruder 130, in this embodiment, when supplying the reaction solvent, a metering pump (not shown) is used to allow a regular amount of the reaction solvent to be injected into the cylinder 140 in high temperature and high pressure state.

The reaction part C is an area for de-crosslinking the raw material by injecting a supercritical fluid, which is the reaction solvent, into the raw material transported through the melting part B.

In the reaction part C, a de-crosslinking reaction is induced under a supercritical condition by the supercritical fluid, which is a reaction solvent, and in the reaction part C, a dehydrogenation reaction atmosphere with a reaction temperature of 280 to 400° C. and a reaction pressure of 0.1 to 20 MPa is formed.

The reaction part C includes a second block group C1 configured by combining a plurality of kneading blocks KB and tooth blocks TM, and a third block group C3 disposed to be spaced apart from the second block group C1 and configured by combining a plurality of kneading blocks. In addition, in the reaction part C, an eighth spiral portion C2 is successively disposed at the rear end of the second block group C1.

The second block group C1 is to improve de-crosslinking of the raw material, and includes forward kneading blocks KB-R and tooth blocks TM alternately arranged along the transporting direction of the raw material. That is, in this embodiment, in the second block group C1, the forward kneading block KB-R the tooth block TM, the forward kneading block KB-R and the tooth block TM are sequentially arranged in order. The tooth block TM may be a 3R type in which three disks with teeth formed on the outer circumferential surface are arranged.

The third block group C3 is disposed to be spaced apart from the second block group C1 with the eighth spiral portion C2 being interposed therebetween in order to further improve the kneading and de-crosslinking of the raw material. The third block group C3 is configured by combining two forward kneading blocks KB-R a neutral kneading block KB-N and a reverse kneading block KB-L along the transporting direction of the raw material. Since the third block group C3 includes the reverse kneading block KB-L, the reaction time required for the de-crosslinking reaction may be sufficiently secured, thereby further promoting the de-crosslinking reaction.

Meanwhile, when the second block group C1 and third block group C3 are successively arranged, the residence time of the raw material may become excessively long and the raw material may receive a lot of shear to intensify thermal decomposition, so an eighth spiral portion C2 is provided between the second block group C1 and the third block group C3. The eighth spiral portion C2 may be formed to have the same pitch as the seventh spiral portion B9.

The eighth spiral portion C2 facilitates the transportation of the raw material that is de-crosslinked through the second block group C1, and also transports the raw material to the third block group C3 after concentrating the raw material.

The discharge part D is an area where the polyethylene resin recycled by de-crosslinking in the reaction part C is processed and discharged in the form of pellets or wires. Also, the discharge part D is an area where the polyethylene resin recycled after the de-crosslinking reaction in the reaction part C is separated from the reaction solvent and discharged.

The discharge part D includes a ninth spiral portion D1 and a tenth spiral portion D2 successively disposed along the transporting direction of the raw material. In addition, the ninth spiral portion D1 may be formed to have a greater pitch than the tenth spiral portion D2, and the ninth spiral portion D1 may be formed to have the same pitch as the sixth spiral portion B8.

The polyethylene resin recycled by de-crosslinking is discharged in the form of pellets or wires while passing through the ninth spiral portion D1 and the tenth spiral portion D2. Since the tenth spiral portion D2 is formed to have a smaller pitch than the ninth spiral portion D1, the reaction solvent after the de-crosslinking reaction may be easily discharged without moving to the tenth spiral portion D2.

Meanwhile, the cylinder 140 includes a gas discharge part 145 provided at a position corresponding to the ninth spiral portion D1 to discharge the reaction solvent and residual gas after the de-crosslinking reaction and maintain the vacuum. In addition, the cylinder 140 may include an exhaust part 146 provided at a position corresponding to the discharge part D to discharge the recycled polyethylene resin, and the recycled polyethylene resin is discharged in the form of pellets or wires while being discharged through the exhaust part 146.

In addition, the recycled polyethylene resin discharged from exhaust part 146 is cooled by the cooling unit 170.

The present disclosure is not limited to the embodiments described above, and it is apparent to those of ordinary skill in the art that various modifications and changes can be made without departing from the idea and scope of the present disclosure. Accordingly, it should be said that such modifications or changes are included in the scope of the present disclosure.

[Reference Symbols]

| | |
|---|---|
| 100: recycling apparatus for a cross-linked polyethylene resin | |
| 110: raw material supply unit | |
| 130: twin screw extruder | 150: twin screw |
| A: supply part | B: melting part |
| C: reaction part | D: discharge part |
| 160: driving motor | 170: cooling unit |

What is claimed is:

1. A recycling apparatus for a cross-linked polyethylene resin, comprising:
    a raw material supply unit configured to supply a raw material that is a cross-linked polyethylene resin; and
    a twin screw extruder configured to receive the raw material from the raw material supply unit, the twin screw extruder including a cylinder and a twin screw installed inside the cylinder to rotate in a same direction, the twin screw extruder being configured to de-crosslink and recycle the raw material under a de-crosslinking reaction temperature and reaction pressure atmosphere while continuously transporting the raw material along the twin screw by rotation of the twin screw;
    wherein the twin screw includes:
    a supply part configured to press and melt the raw material while transporting the raw material;
    a melting part configured to melt and knead the raw material transported through the supply part;
    a reaction part configured to inject a supercritical fluid serving as a reaction solvent into the raw material after the raw material is transported through the melting part to maintain a supercritical condition and to de-crosslink the raw material; and
    a discharge part configured to process and discharge the de-crosslinked and recycled raw material; and
    wherein the melting part includes:
    a plurality of first block groups spaced apart from each other, each first block group comprising a plurality of kneading blocks; and
    a reverse spiral portion at a rear end of any one of the first block groups,
    wherein each first block group includes:
    a forward kneading block and a neutral kneading block successively disposed along a transporting direction of the raw material.

2. The recycling apparatus for a cross-linked polyethylene resin according to claim 1, wherein three first block groups are spaced apart from each other along the transporting direction of the raw material, wherein a first spiral portion is disposed at a rear end of a first one of the three first block groups, a second spiral portion is disposed at a rear end of a second one of the three first block groups, a third spiral portion is disposed at a rear end of the second spiral portion, a fourth spiral portion is disposed at a rear end of a third one of the three first block groups, and a fifth spiral portion is disposed at a rear end of the fourth spiral portion, wherein the second spiral portion is formed to have a greater pitch than the third spiral portion, and the fourth spiral portion is formed to have a greater pitch than the fifth spiral portion, and wherein the reverse spiral portion is disposed at a front end of the second spiral portion.

3. The recycling apparatus for a cross-linked polyethylene resin according to claim 1, wherein the reaction part includes:

a second block group comprising tooth blocks and a second plurality of kneading blocks;

a third block group spaced apart from the second block group and comprising a third plurality of kneading blocks; and a spiral portion disposed at a rear end of the second block group, wherein the second block group includes forward kneading blocks and the tooth blocks alternately arranged along the transporting direction of the raw material, wherein the third block group includes:

a forward kneading block;

a neutral kneading block disposed at a rear end of the forward kneading block along the transporting direction of the raw material; and a reverse kneading block disposed at a rear end of the neutral kneading block along the transporting direction of the raw material.

4. The recycling apparatus for a cross-linked polyethylene according to claim 1, wherein the discharge part includes a first spiral portion and a second spiral portion successively disposed along the transporting direction of the raw material, and wherein the first spiral portion is formed to have a greater pitch than the second spiral portion.

5. The recycling apparatus for a cross-linked polyethylene according to claim 1, wherein the reaction part is configured to inject the supercritical fluid serving as the reaction solvent as one of a distilled water in a supercritical state, methanol, ethanol, or as a mixture of the distilled water in the supercritical state, the methanol and the ethanol.

6. The recycling apparatus for a cross-linked polyethylene resin according to claim 1, wherein the twin screw extruder is configured to melt, knead, de-crosslink and process the raw material with the reaction temperature at 280 to 400° C. and the reaction pressure at 0.1 to 20 MPa.

7. The recycling apparatus for a cross-linked polyethylene resin according to claim 1, wherein the reaction part is made of stainless steel 316 (SUS316), and wherein the supply part, the melting part and the discharge part are made of nickel chromium molybdenum steel.

8. The recycling apparatus for a cross-linked polyethylene resin according to claim 1, wherein a ratio (L/D) of total length to diameter of the twin screw is 32:1 to 48:1.

9. The recycling apparatus for a cross-linked polyethylene resin according to claim 1, wherein the twin screw extruder is configured to receive the raw material in a form that includes a cross-linked polyethylene wire, a cross-linked polyethylene foam, and a cross-linked polyethylene pipe.

* * * * *